(12) United States Patent
Tardy et al.

(10) Patent No.: US 6,718,106 B2
(45) Date of Patent: Apr. 6, 2004

(54) CLADDING-PUMPED OPTICAL FIBRE AND METHOD FOR MAKING SAME

(75) Inventors: Andre Tardy, Egly (FR); Laurent Gasca, Villebon sur Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/069,781

(22) PCT Filed: Jun. 28, 2001

(86) PCT No.: PCT/FR01/02062

§ 371 (c)(1),
(2), (4) Date: Feb. 28, 2002

(87) PCT Pub. No.: WO02/03510

PCT Pub. Date: Jan. 10, 2002

(65) Prior Publication Data

US 2002/0114602 A1 Aug. 22, 2002

(30) Foreign Application Priority Data

Jul. 6, 2000 (FR) .............................................. 00 08796

(51) Int. Cl.$^7$ ................................................. G02B 6/00
(52) U.S. Cl. ............................ 385/123; 385/146; 372/6; 65/408; 65/411
(58) Field of Search ................................. 385/123–128, 385/141, 142, 144, 146; 65/385, 390, 398, 403, 406, 408, 409, 412, 413, 411; 372/6

(56) References Cited

U.S. PATENT DOCUMENTS

| 4,478,489 | A | * | 10/1984 | Blankenship et al. .......... 385/11 |
|---|---|---|---|---|
| 4,709,987 | A | * | 12/1987 | Blackburn et al. ........... 385/141 |
| 4,838,916 | A | * | 6/1989 | Edahiro et al. ................ 65/412 |
| 5,339,372 | A | * | 8/1994 | Miller et al. .................... 385/29 |
| 5,519,801 | A | * | 5/1996 | Le Noane et al. ........... 385/115 |
| 5,533,163 | A | * | 7/1996 | Muendel ....................... 385/126 |
| 5,570,448 | A | * | 10/1996 | Imoto et al. .................. 385/126 |
| 5,594,823 | A | * | 1/1997 | Tardy et al. .................... 385/46 |
| 5,689,578 | A | * | 11/1997 | Yamauchi et al. ........... 385/123 |
| 5,907,652 | A | * | 5/1999 | DiGiovanni et al. ......... 385/125 |
| 5,944,867 | A | * | 8/1999 | Chesnoy et al. ............... 65/408 |
| 5,949,941 | A | * | 9/1999 | DiGiovanni ................. 385/127 |
| 6,031,849 | A | * | 2/2000 | Ball et al. ......................... 372/6 |
| 6,073,465 | A | * | 6/2000 | Oleskevich et al. ........... 65/390 |
| 6,089,044 | A | * | 7/2000 | Hardy et al. .................... 65/408 |
| 6,154,594 | A | * | 11/2000 | Fiacco et al. ................ 385/126 |
| 6,157,763 | A | * | 12/2000 | Grubb et al. ................. 385/126 |
| 6,243,522 | B1 | * | 6/2001 | Allan et al. .................. 385/123 |
| 6,415,079 | B1 | * | 7/2002 | Burdge et al. ................. 385/37 |
| 6,434,295 | B1 | * | 8/2002 | MacCormack et al. ....... 385/27 |
| 6,480,659 | B1 | * | 11/2002 | Patlakh et al. ............... 385/125 |
| 6,483,973 | B1 | * | 11/2002 | Mazzarese et al. .......... 385/123 |
| 2001/0002219 | A1 | * | 5/2001 | Mori et al. ..................... 385/46 |
| 2002/0172486 | A1 | * | 11/2002 | Ferman ........................ 385/128 |
| 2003/0031444 | A1 | * | 2/2003 | Croteau et al. .............. 385/127 |
| 2003/0169987 | | * | 9/2003 | Eggleton et al. ............. 385/125 |

* cited by examiner

*Primary Examiner*—Hemang Sanghavi
*Assistant Examiner*—Scott Knauss
(74) *Attorney, Agent, or Firm*—Sughrue Mion, PLLC

(57) ABSTRACT

The invention concerns an optical fiber pumped through the cladding, including:
  a core having an optical index n1,
  around the core, a first cladding having an index n2 lower than n1, and
  around the first cladding, a second cladding having an index n3 lower than n2,
  characterized in that the interface between the first cladding and the second cladding has a substantially polygonal cross section.

Figure 1:
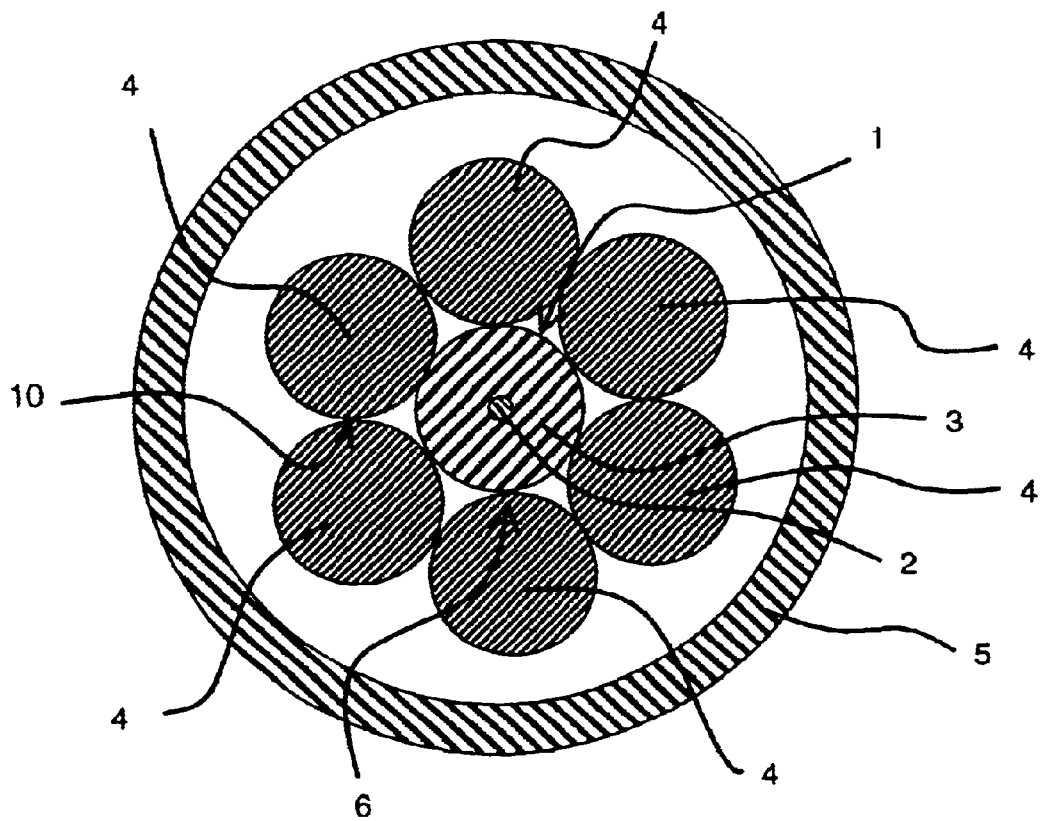

The invention also concerns a method of fabricating an optical fiber pumped through the cladding, characterized in that it consists in executing the following steps:
  placing around a central optical preform including a core having an index n1 surrounded by a first cladding having an index n2 lower than n1, a plurality of rods having an index n3 lower than n2, and
  drawing the optical preform and the rods in a vacuum to obtain an optical fiber including a core and two claddings.

13 Claims, 3 Drawing Sheets

CLADDING-PUMPED OPTICAL FIBRE AND METHOD FOR MAKING SAME

The present invention relates to an optical fiber pumped through the cladding and a method of fabricating it.

Optical fibers pumped through the cladding have a particular structure such that they can accept more pump optical power and thereby increase the amplification of the optical signal, which is achieved by absorbing energy.

The amplification energy is supplied by a high-power laser coupled into a cladding around the core of the optical fiber, the luminous energy supplied to the cladding in this way being absorbed by the core as soon as the light rays propagating in the cladding cross the interface between the core and the cladding.

Obviously the efficiency of energy pumping is essentially conditioned by the efficiency of the coupling between the core and the cladding.

One problem that arises with cylindrical core/cladding interfaces is that some light rays conveyed by the cladding follow a helical trajectory around the core without ever impinging on the interface.

The energy conveyed by these rays is therefore injected into the cladding in vain, because it is never used to amplify the signal transported by the core.

To attempt to solve this problem, it has already been proposed, in particular in U.S. Pat. No. 5,966,491, to form longitudinal grooves in the outside surface of the cladding to break up the helical trajectories of the light rays and force them to impinge on the core/cladding interface.

Another solution, proposed in WO 99/30 391, consists in inserting rods into longitudinal passages formed in the cladding to produce radial protuberances at the surface of the cladding and thereby disturb the trajectory of the light rays in the cladding.

The present invention aims to propose an optical fiber with a new structure based on the same principle of disturbing light rays in the cladding.

The present invention provides an optical fiber pumped through the cladding, including:
 a core having an optical index n1,
 around the core, a first cladding having an index n2 lower than n1, and
 around the first cladding, a second cladding having an index n3 lower than n2,
 characterized in that the interface between the first cladding and the second cladding has a substantially polygonal cross section.

Obviously, thanks to the polygonal shape of the cross section of the interface, any light ray conveyed by the cladding that might tend to trace out a helix around the core without ever impinging on the core/cladding interface is disturbed by the interface between the first cladding and the second cladding and cannot maintain its helical trajectory.

Consequently, a large number of light rays that would be lost in a circular section structure are recovered by the invention.

In one particular embodiment of the invention, the core consists of doped silica glass, the first cladding consists of undoped or very weakly doped silica glass, and the second cladding consists of silica glass doped negatively, for example with fluorine or boron.

In another embodiment the core consists of strongly doped silica glass, the first cladding consists of silica glass doped positively, for example with germanium, and the second cladding consists of undoped silica glass.

In either of the above two embodiments, the core has the maximum index n1, the first cladding has an index n2 lower than n1, and the second cladding has an index n3 lower than n2.

In one particular embodiment, the fiber includes a low-index polymer coating around its second cladding and the interface between the second cladding and said coating has a substantially polygonal or multilobed cross section.

In this case, a second pumping structure is formed around the first pumping structure consisting of the core and the first cladding.

This second pumping structure includes the first cladding and the second cladding. The interface between the second cladding and the coating has the same function as that previously described for the interface between the first cladding and the second cladding, namely light rays circulating in the second cladding are prevented from tracing out a helix inside the second cladding without ever impinging on the interface between the first cladding and the second cladding, thanks to the substantially polygonal or multilobed shape of the interface between the second cladding and the covering.

Thus it is possible to use power lasers emitting at larger diameters and the energy injected into the first cladding and into the second cladding by the laser is used to amplify the signal conveyed by the core.

The present invention also provides an economic method of fabricating an optical fiber as described above, which has the advantage of not involving costly mechanical machining.

The method is characterized in that it consists in executing the following steps:
 placing around a central optical preform including a core having an index n1 surrounded by a first cladding having an index n2 lower than n1, a plurality of rods having an index n3 lower than n2, and
 drawing the optical preform and the rods to obtain an optical fiber including a core and two claddings.

In the method according to the invention, the effect of drawing is to compress the rods positioned around the central optical preform to produce the claimed polygonal shape. The polygonal shape results from a balancing of the centripetal forces and plastic deformation of the central optical preform and the rods.

In one particular embodiment, optical preforms with claddings having an index n3 are used as the bars placed around the central optical preform.

An advantage of this embodiment is that it can sometimes be simpler to obtain optical preforms than to obtain homogeneous rods consisting of doped silica glass, for example.

In this case, the core of the preforms used as rods no longer has its usual core function.

In another embodiment of the invention, the central optical preform is one that, if it had been drawn under the usual conditions, would become an optical fiber pumped through the cladding consisting of a core, a first cladding and a second cladding, the whole having a circular section structure, so that a number of light rays circulating helically in the first cladding would not be used.

In this embodiment, the method is characterized in that the central optical preform is, after drawing, an optical fiber pumped through the cladding consisting of a core having an index n1, a first cylindrical cladding of circular section surrounding the core and having an index n2 lower than n1, and a second cylindrical cladding of circular section surrounding the first cladding and having an index n3.

However, thanks to the presence in accordance with the invention of the rods having an index n3 around the central optical preform, drawing said central optical preform and said rods modifies the section of the interface between the first cladding and the second cladding, that section losing its circular symmetry in favor of a polygonal shape because of the balancing of the centripetal forces exerted by the rods.

If the rods are made of the same material as the second cladding of the central optical preform, the second cladding and said tubes fuse and this leads to the formation of a single second cladding.

In one particular embodiment, the central optical preform and the rods having an index n3 are placed in a sleeve within which the atmosphere is controlled for drawing by establishing a vacuum or a partial pressure of neutral gases such as helium or reagents such as $C_2F_6$.

The sleeve is advantageously made of silica whose index has been reduced by appropriate doping, for example with fluorine or boron.

This method, well known for drawing optical fibers, is applied without difficulty to the optical fibers according to the present invention.

In another embodiment of the invention, the drawing atmosphere is controlled without recourse to any sleeve. On the other hand, the interstices between the rods having an index n3 are filled and the atmosphere in the volume delimited by the rods is controlled for drawing by establishing a vacuum or a partial pressure of neutral gases such as helium or reagents such as $C_2F_6$.

In one particular embodiment, the second cladding is enveloped in a low-index polymer coating.

The presence of the polymer coating produces a third cladding having an index n4 lower than n3 and which channels the light rays in the second cladding to produce a second pumping structure between the third cladding and the second cladding.

Figure 2:
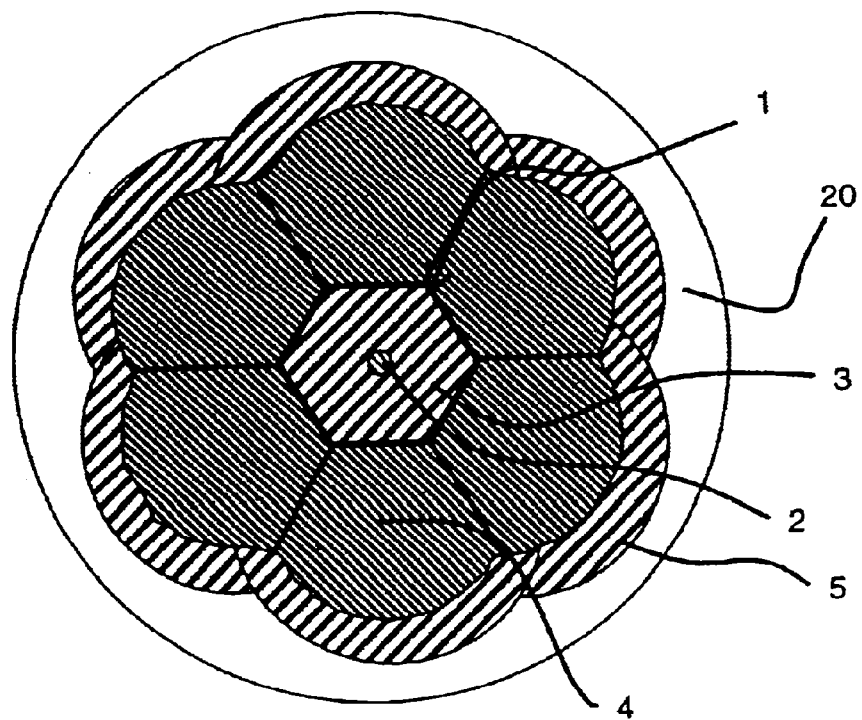
Figure 3:
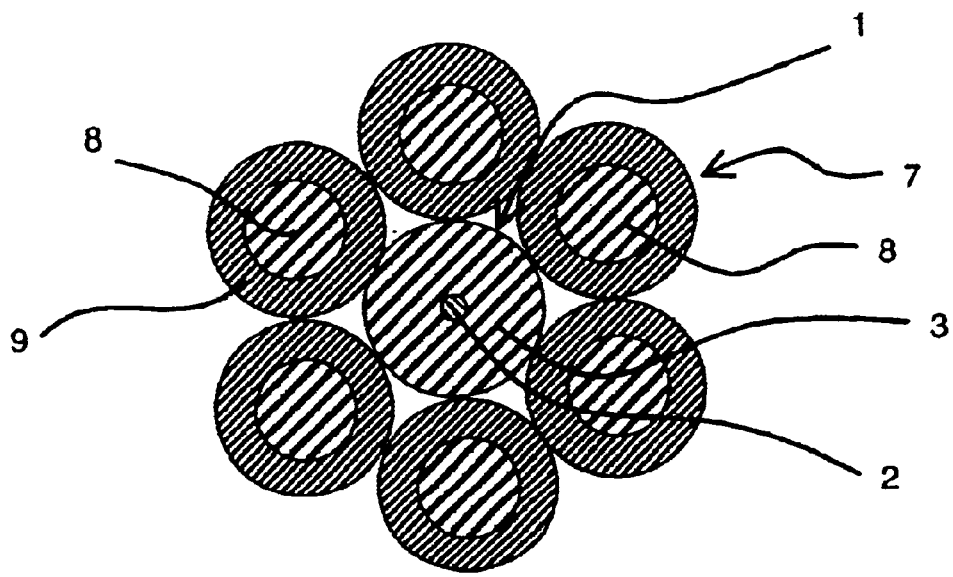
Figure 4:
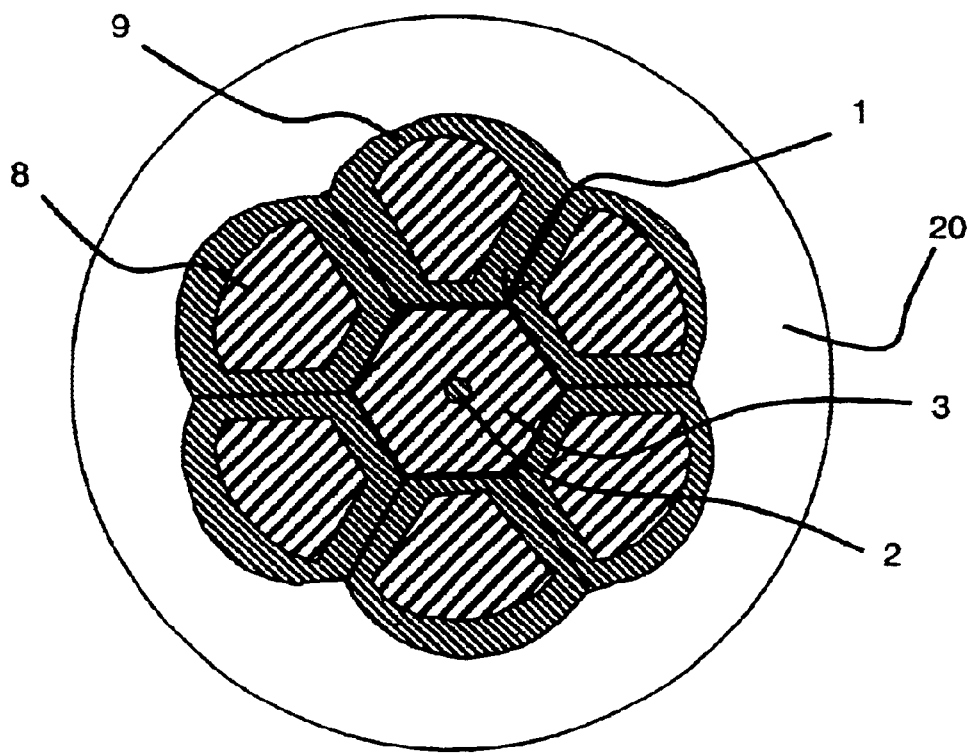
Figure 5:
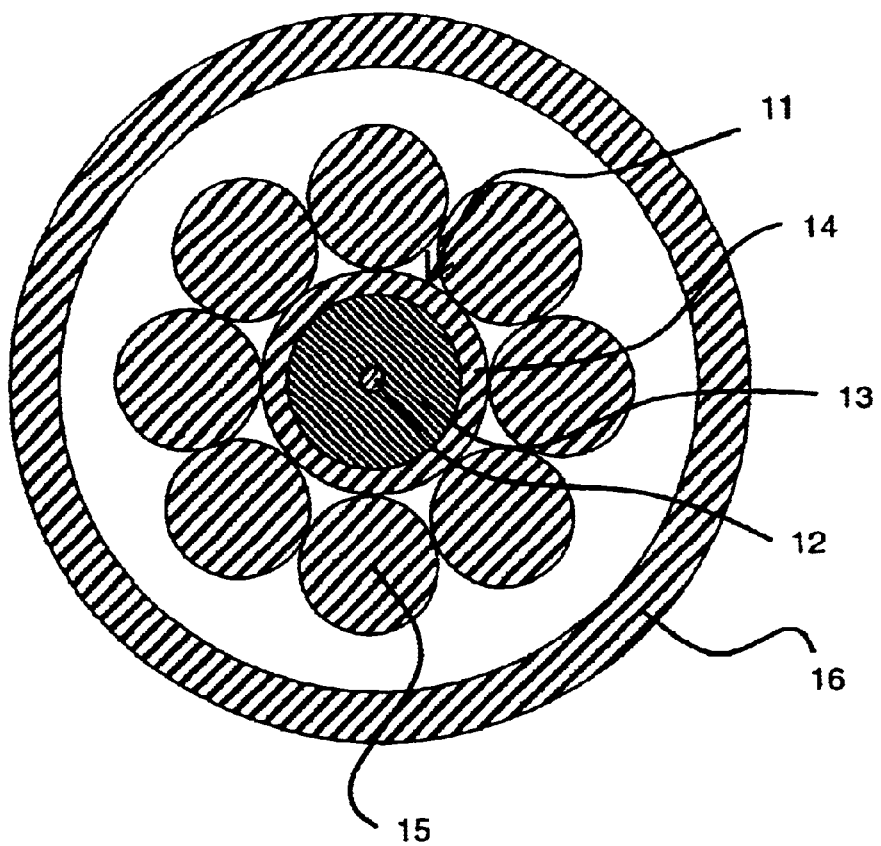
Figure 6:
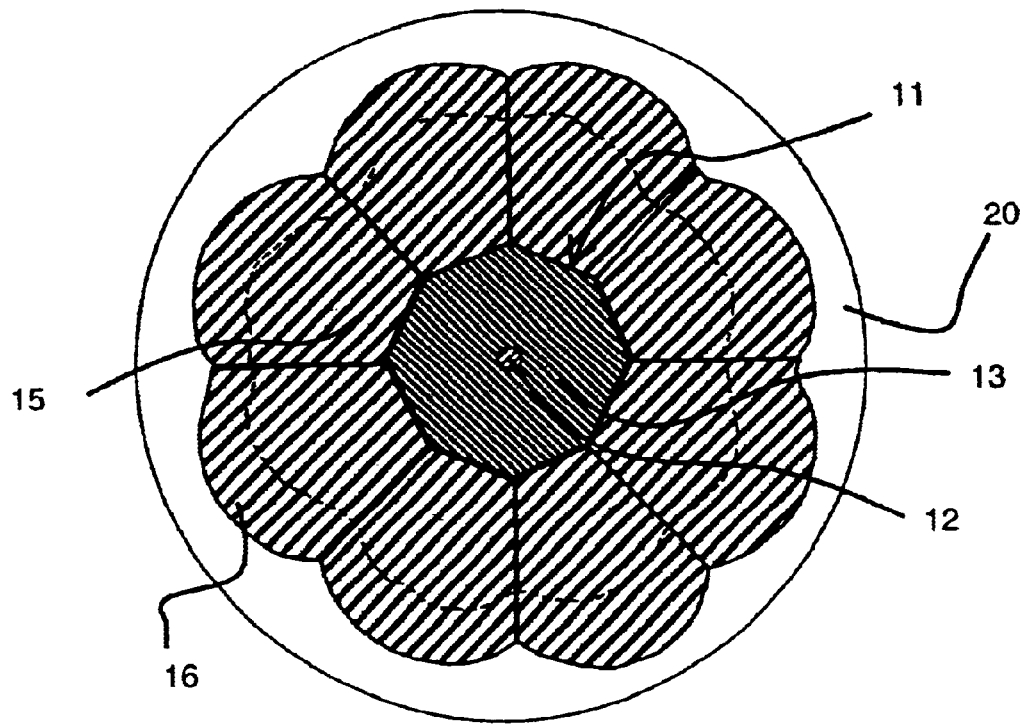

To facilitate an understanding of the invention, a few non-limiting examples are described next with the aid of the accompanying drawings, in which:

FIG. 1 is a cross section of an assembly intended to form a pumping structure according to the invention, FIG. 2 is a section analogous to FIG. 1 of the assembly after drawing in a vacuum, FIG. 3 is a cross section of an assembly intended to form another pumping structure according to the invention, FIG. 4 is a section analogous to FIG. 3 of the assembly after drawing in a vacuum, FIG. 5 is a cross section of an assembly intended to form a double pumping structure according to the invention, and FIG. 6 is a section analogous to FIG. 5 showing the assembly after drawing.

FIG. 1 shows an optical preform 1 including a monomode core 2 doped with appropriate rare earths for pumping. This is well known to the person skilled in the art. The core has a high first refractive index n1.

A first cladding 3 surrounds the core 2. The cladding 3 consists of undoped silica glass having a refractive index n2 lower than that n1 of the core.

An assembly of six cylindrical rods 4 of glass with a low refractive index, i.e. doped negatively so that the refractive index n3 is lower than the refractive index n2 of the first cladding, is held in position and introduced into a sleeve 5 that can be made of the same material as the cylindrical rods 4.

The combination is introduced into a drawing furnace (not shown) with the interior of the sleeve 5 evacuated.

The flow of the rods and the preform is controlled by operating on the drawing tension and rate.

The six cylindrical rods 4 each exert a centripetal force on the central preform 1 and balancing these forces causes the central preform to be crushed at each of six points 6 of contact with the cylindrical rods 4.

Each cylindrical rod 4 is also crushed at its point of contact with the preform, so that a contact plane is formed between the preform 1 and each cylindrical rod 4.

As a result of this the interface between the preform and the set of six cylindrical rods assumes a substantially hexagonal configuration, as can be seen in FIG. 2.

This polygonal shape is maintained in the drawing operation that converts the compacted preform into a fiber with appropriate external dimensions.

The fiber is then enclosed in a polymer coating 20 which protects it.

In the example shown in FIGS. 3 and 4, the cylindrical rods are replaced by composite preforms 7, such as Heraeus Fluosil composite preforms, which consist of a silica core 8 and a fluorosilicate cladding 9.

The combination can be introduced into a sleeve and then put into a drawing furnace, as previously described.

However, in the example shown in FIGS. 3 and 4, no sleeve was used. The interstices between the generatrices 10 along which the peripheral composite preforms 7 are in contact in pairs are filled in so that said preforms delimit a closed space surrounding the central preform 1, within which closed space a vacuum can be established, in the same manner as inside a sleeve.

Drawing in a vacuum in a furnace (not shown) produces the structure shown in FIG. 4, which shows that the fluorosilicate first cladding 9 of each cylindrical rod 7 provides a third cladding of index n3, lower than the index n2, for the central preform 1, which is therefore surrounded by a first cladding 3 having an index n2 and a second cladding 9 having an index n3.

In accordance with the invention, the interface between the first cladding and the second cladding has a hexagonal section.

In the embodiment shown in FIGS. 5 and 6, the central preform previously described including a core and a first cladding is replaced by a central preform 11 including a core 12, a first cladding 13 and a second cladding 14.

This kind of central preform 11 is traditionally used to obtain a circularly symmetrical pumping structure.

Eight cylindrical silica glass rods 15 are placed at the periphery of the central preform, and the combination is introduced into a silica glass sleeve 16.

When a vacuum has been established in the sleeve, the preform 11 and the cylindrical rods 15 are drawn in a drawing furnace (not shown).

The flow of the cylindrical rods 15, on the one hand, and of the second cladding 14 of the central preform, on the other hand, produces an octagonal section interface between the first cladding 13 and the second cladding 14, which second cladding is the result of fusion of the original second cladding 14 of the preform and the cylindrical rods 15.

In practice, the original second cladding 14 of the preform is the substrate tube on which the MCVD technique has been used to deposit the doped silica glass layers constituting the guide structures of the fiber.

Clearly, in this example, it is not necessarily indispensable to eliminate the substrate tube completely, for example by evaporation, to implement the invention, the flow of the silica glass being obtained even if a thickness of the substrate tube remains around the first cladding of the preform.

The examples that have just been described are obviously not limiting on the scope of the invention, and can be modified in any way within the scope of the appended claims.

In particular, although drawing in a vacuum has been described, it is clear that any form of drawing in a controlled atmosphere, for example in a helium atmosphere or a $C_2F_6$ atmosphere, could be used to implement the invention.

What is claimed is:

1. A method of fabricating an optical fiber pumped through a cladding, comprising:

placing around a central optical preform including a core having an index n1 surrounded by a first cladding having an index n2 lower than n1, a plurality of rods, which will form a second cladding of the optical fiber, the rods having an index n3 lower than n2, and drawing the optical preform and the rods to obtain the optical fiber including a core and two claddings comprising the first cladding and the second cladding.

2. A method according to claim 1, wherein optical preforms with claddings having an index n3 are used as the rods placed around the central optical preform.

3. A method according to claim 1, wherein the central optical preform is, after drawing, an optical fiber pumped through the cladding consisting of a core having an index n1, a first cylindrical cladding of circular section surrounding the core and having an index n2 lower than n1, and a second cylindrical cladding of circular section surrounding the first cladding and having an index n3.

4. A method according to claim 1, wherein the central optical preform and the rods having an index n3 are placed in a sleeve within which an atmosphere is controlled for drawing by establishing a vacuum or a partial pressure of neutral gases or reagents.

5. A method according to claim 4, wherein the sleeve is made of silica whose index has been reduced by appropriate doping.

6. A method according to claim 1, wherein the interstices between the rods having an index n3 are filled and an atmosphere in a volume delimited by the rods is controlled for drawing by establishing a vacuum or a partial pressure of neutral gases or reagents.

7. A method according to claim 1, wherein the second cladding is enveloped in a low-index polymer coating.

8. A method according to claim 4, wherein the neutral gases are helium.

9. A method according to claim 4, wherein the reagents are $C_2F_6$.

10. A method according to claim 5, wherein the doping is with fluorine.

11. A method according to claim 5, wherein the doping is with boron.

12. A method according to claim 6, wherein the neutral gases are helium.

13. A method according to claim 6, wherein the reagents are $C_2F_6$.

* * * * *